(12) United States Patent
Wachtell et al.

(10) Patent No.: US 8,983,181 B2
(45) Date of Patent: Mar. 17, 2015

(54) METHOD AND SYSTEM FOR DETERMINING THE COLOR OF AN OBJECT IN A PHOTO

(71) Applicants: Peter James Wachtell, Boise, ID (US); Douglas C. Looney, Boise, ID (US); Raino Zoller, Boise, ID (US)

(72) Inventors: Peter James Wachtell, Boise, ID (US); Douglas C. Looney, Boise, ID (US); Raino Zoller, Boise, ID (US)

(73) Assignee: Psiflow Technology Inc., Boise, ID (US)

( * ) Notice: Subject to any disclaimer, the term of this patent is extended or adjusted under 35 U.S.C. 154(b) by 202 days.

(21) Appl. No.: 13/687,507

(22) Filed: Nov. 28, 2012

(65) Prior Publication Data

US 2013/0136347 A1 May 30, 2013

Related U.S. Application Data

(60) Provisional application No. 61/564,272, filed on Nov. 28, 2011.

(51) Int. Cl.
*G06K 9/00* (2006.01)
*G06T 7/40* (2006.01)

(52) U.S. Cl.
CPC .................................. *G06T 7/408* (2013.01)
USPC ...................................................... 382/162

(58) Field of Classification Search
CPC .......... H04N 1/00132; H04N 1/00135; H04N 1/00167; H04N 1/00188; H04N 1/00249; H04N 1/00267; H04N 1/32208; H04N 1/32309; H04N 1/3872; H04N 1/40093; H04N 1/6008; H04N 1/6011; H04N 1/603; H04N 1/6033; H04N 1/6054; H04N 1/6058; H04N 1/62; G01J 3/46; G01J 3/462; G01J 3/1463; G01J 3/465; G01J 3/52; G06K 9/00362; G06K 9/4652; G06T 5/00; G06T 7/408; G06T 9/00; G06T 15/00; G06T 2207/10024; G06T 2207/30201
See application file for complete search history.

(56) References Cited

U.S. PATENT DOCUMENTS

| | | | |
|---|---|---|---|
| 6,157,469 A | 12/2000 | Mestha | |
| 6,163,389 A * | 12/2000 | Buhr et al. | 358/527 |
| 6,188,786 B1 | 2/2001 | Ueda et al. | |
| 6,519,360 B1 | 2/2003 | Tanaka | |
| 6,748,106 B1 * | 6/2004 | Bryant et al. | 382/162 |
| 6,757,076 B1 | 6/2004 | Mestha et al. | |
| 7,737,991 B2 | 6/2010 | McClanahan | |
| 8,319,857 B2 * | 11/2012 | Qu et al. | 348/228.1 |

* cited by examiner

*Primary Examiner* — Jose Couso
(74) *Attorney, Agent, or Firm* — MH2 Technology Law Group, LLP

(57) ABSTRACT

A method for interpreting a color in a photographic digital image is disclosed. The method includes receiving a photographic digital image comprising a color portion proximate to a color scale. Different spatial positions on the color scale correspond to different known outcome values. The position of the color portion in the digital image is located and a digital color value for the color portion is determined. Digital scale color values at different positions on the color scale are determined. The digital color value is compared to one or more digital scale color values to determine a digital reference color value that approximates the digital color value of the color portion. A position of the digital reference color value on the color scale is determined. An outcome value is then determined based on the position of the digital reference color value.

18 Claims, 10 Drawing Sheets
(7 of 10 Drawing Sheet(s) Filed in Color)

METHOD AND SYSTEM FOR DETERMINING THE COLOR OF AN OBJECT IN A PHOTO

FIELD OF THE DISCLOSURE

This application claims priority benefit to U.S. Provisional Application No. 61/564,272, filed Nov. 28, 2011, the disclosure of which is hereby incorporated by reference in its entirety.

FIELD OF THE DISCLOSURE

This application relates generally to a method for determining the color of an object in a photo.

BACKGROUND

Chemistry has provided many instances of test results that identify the presence or lack thereof of a chemical, and/or its concentration, by the color of a given solution or substance. This knowledge has resulted in many test processes that involve the combination of one or more substances to generate a chemical reaction that causes a change in color that can be seen by the human eye and interpreted for the result. A good example of this is the use of color test strips which comprise a small plastic strip with chemical impregnated patches glued thereto. The test strip may be dipped into a solution and, based on the color that the patches subsequently turn, an estimate may be made regarding the properties (for example pH, alkalinity and/or free chlorine levels of the solution).

The test strip is read by comparing the color of the patches on the test strip to a color chart that is often provided on the test strip container itself. Current test strip technology relies upon a human to dip the test strip in a consistent manner and to read the test strip within a prescribed time period. There is often variability in the test results that can be due to factors related to human error, including incorrect dip times, incorrect dipping technique, or incorrect time between dip and reading.

Additional variability and error is often introduced by the variation in the perception and interpretation of color between and amongst human test readers. Age, gender and individual acuity allow for a broad range of variability in determining color test results, which can result in reduced accuracy.

A color chart that can be used to correlate test colors to results is generally provided with currently available color tests. A user of the color test can compare the test strip color obtained from performing the test to the color chart in order to interpret the results of the test. However, the color chart is subject to printing process variability, inks used, paper used, exposure to sunlight and environmental elements. The resulting variability in test strip comparison charts creates additional variability in the human test reader's ability to accurately read the test strip. As a result of all of the variability described, color test strips are considered to be good, but not generally to be highly accurate at quantitative measurement.

In the areas of digital photography and digital imaging, it is known to employ software algorithms to adjust the color of the final image to an acceptable level for viewing. However, these algorithms are generally employed to provide an idealized look to the image, for example, to make the colors more appealing to users. These algorithms generally do not attempt to improve accuracy and/or precision of color comparisons between colors in either a film photograph or digital photograph and colors as they are perceived in real world conditions. Nor do they generally involve taking into account conditions existing at the time a photo is taken that could effect real world color measurements, or the effects that film processing or digital enhancement of colors can have in determining real world color values.

There remains a need for an improved method and system for more accurately determining color test results. There also remains a need for improved methods and systems for more accurately or precisely determining colors of objects as they are perceived in real world conditions using digital images or other color images of the objects.

SUMMARY

An embodiment of the present disclosure is directed to a method for interpreting a color in a photographic digital image. The method comprises receiving a photographic digital image comprising a color portion proximate to a color scale. Different spatial positions on the color scale correspond to different known outcome values. The position of the color portion in the digital image is located and a digital color value for the color portion is determined. Digital scale color values at different positions on the color scale are determined. The digital color value is compared to one or more digital scale color values to determine a digital reference color value that approximates the digital color value of the color portion. A position of the digital reference color value on the color scale is determined. An outcome value is then determined based on the position of the digital reference color value.

Another embodiment of the present disclosure is directed to a non-transient computer readable media embedded with a set of instructions for carrying out a method. The method comprises receiving a photographic digital image comprising a color portion proximate to a color scale. Different spatial positions on the color scale correspond to different known outcome values. The position of the color portion in the digital image is located and a digital color value for the color portion is determined. Digital scale color values at different positions on the color scale are determined. The digital color value is compared to one or more digital scale color values to determine a digital reference color value that approximates the digital color value of the color portion. A position of the digital reference color value on the color scale is determined. An outcome value is then determined based on the position of the digital reference color value.

Yet another embodiment of the present disclosure is directed to a color test system. The system comprises a color test strip comprising a color patch for testing a sample. The color patch is configured to turn different colors depending on sample chemistry. The system also comprises a color reference. The color reference comprises a color scale positioned on a media; a target area printed on the media for positioning a test strip proximate the color scale; and reference points printed on the media, the reference points being different form the color scale and configured to allow identification and orientation of a digital image of the color test system by a computer system.

The processes and systems of the present application can provide one or more of the following advantages: allowing a more accurate interpretation of the color of an object in a digital photograph or other digital image; allowing a more accurate determination of the measured result that a color might represent in a color dependent testing process; allowing for the normalization of any shifts in color while taking into account interpretation error, shading, lighting condition or any variables that can effect color that have been introduced by the digital image capture device; more accurately or precisely determining colors of objects as they are perceived in real world conditions using digital images or other color images of the objects; allowing for a more consistent and reliable reading of the color of a test strip or other color dependent testing process; or improving the consistency of the reading of the test results for tests involving the interpretation of color such that they can become more accurate and/or precise and/or may be used for more quantitative measurements.

Other objectives and advantages of the present invention will become apparent from the following descriptions, taken in connection with the accompanying drawings, wherein, by way of illustration and example, an embodiment of the present invention is disclosed.

It is to be understood that both the foregoing general description and the following detailed description are exemplary and explanatory only and are not restrictive of the present teachings, as claimed.

BRIEF DESCRIPTION OF THE DRAWINGS

The patent or application file contains at least one drawing executed in color. Copies of this patent or patent application publication with color drawing will be provided by the Patent Office upon request and payment of the necessary fee.

The accompanying drawings, which are incorporated in and constitutes a part of this specification, illustrates an embodiment of the present teachings and together with the description, serves to explain the principles of the present teachings.

Figure 1:
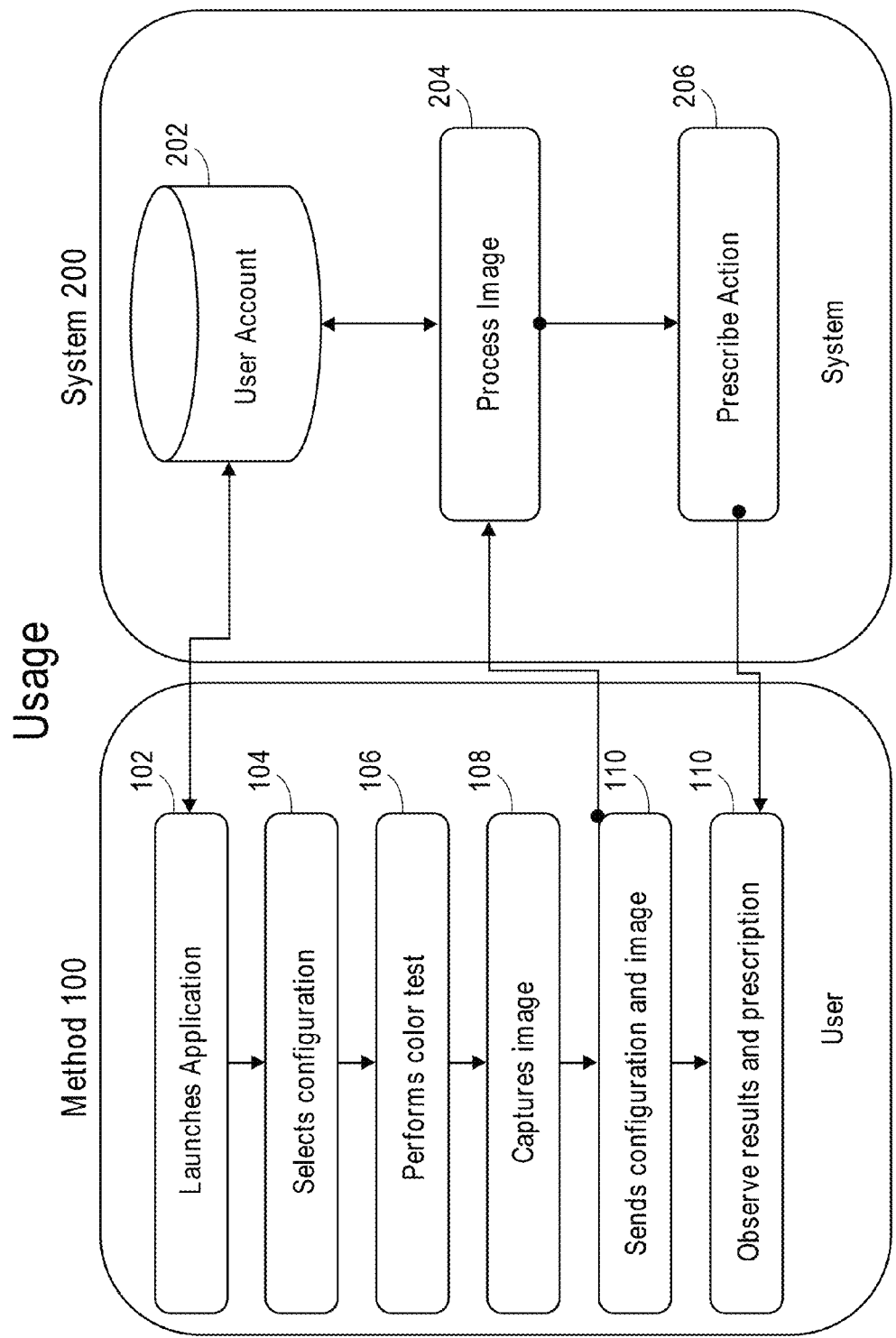
FIG. 1 illustrates a method for determining a test result and a prescribed action based on an image of a color test, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawing. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to a method that includes reading of a color test strip or other color test object with improved accuracy. The method comprises a system whereby a test user takes a digital photo of the test in close proximity to a preprinted color scale that is designed specifically for this purpose and has been distributed to the test user as part of the test apparatus. The color scale will be described below as being printed on a color card, but could be printed on any suitable medium, such as on packaging of a test kit or on an instruction pamphlet. The photographer (test user) generated digital image is then submitted to a computer for processing, reading and interpretation. In an embodiment, determinations of a color test are made from computer analysis of the digital picture, measuring the color digitally, and comparing the measured color of the test to a digital representation of a color scale in the same digital picture to determine a relative location of the measured color on the color scale. The relative location on the color scale can be used to determine an outcome for the color test. These processes will be discussed in detail below with respect to FIGS. 1-9.

FIG. 1 illustrates a method 100, according to an embodiment of the present disclosure. A first step of method 100 can include a user launching a software application 102. This can involve logging onto a user account of system 200. The software application 102 could be designed to provide a system that measures and records color-based test results, and provides a user recommendations based upon these results. For example, an application could be used to determine the results of a color based test used to measure pool chemistry. The application could return the results of that test, along with a prescription on how to respond to that test, if desired. In the case of a pool water test, this could be a recommendation on how to balance the pool's pH.

The process and system of the present disclosure is not limited to use for testing swimming pool water and could be used for any color based testing process. Examples of other processes for which the present method could be employed include testing fish tank water, testing the sanitation of solutions or surfaces for a cleaning process, and testing for the presence or concentration of certain health markers in humans or animals such as glucose level. Another example application is testing and adjusting color printers, as will be discussed in more detail below.

A second step 104 of method 100 can comprise determining and selecting a configuration of the test to be employed. For example, this may comprise selecting a particular type of test strip to be employed. An application could support different tests and/or test strips with varying chemistries and number of tests. For example, an application could support test strips with one or more chemistries, such as 3, 4, 5 or 6 chemistries.

Determining and selecting the test configuration can be accomplished in any suitable manner. For example, information regarding various test configurations can be stored on a database or any other computer readable medium accessible by system 200. Information regarding the various test options can be made available to a user through any suitable user interface, such as an IPhone or Android cellular phone application or a web based software application accessed from the user's personal computer. The user can be prompted by the software application to select the appropriate configuration of the selected test. Alternatively, the system could determine the configuration automatically based upon information collected from the digital image. This could include reading information provided on the color card, which could include the information in the form of a bar code or QR code, or, for example by analyzing the image to determine the number of test patches on the test strip. An example of a test strip with a plurality of test patches 578, 580 and 582 is shown positioned on a color card 571 in FIG. 6.

The third step 106 of method 100 comprises performing the color test. This can involve dipping a color test strip into, for example, the water of a swimming pool or a fish tank, and waiting the prescribed time for the colors to develop. The colors can represent the chemical conditions in the water sample, such as chlorine concentration, pH, and/or alkalinity of the water.

Figure 5:
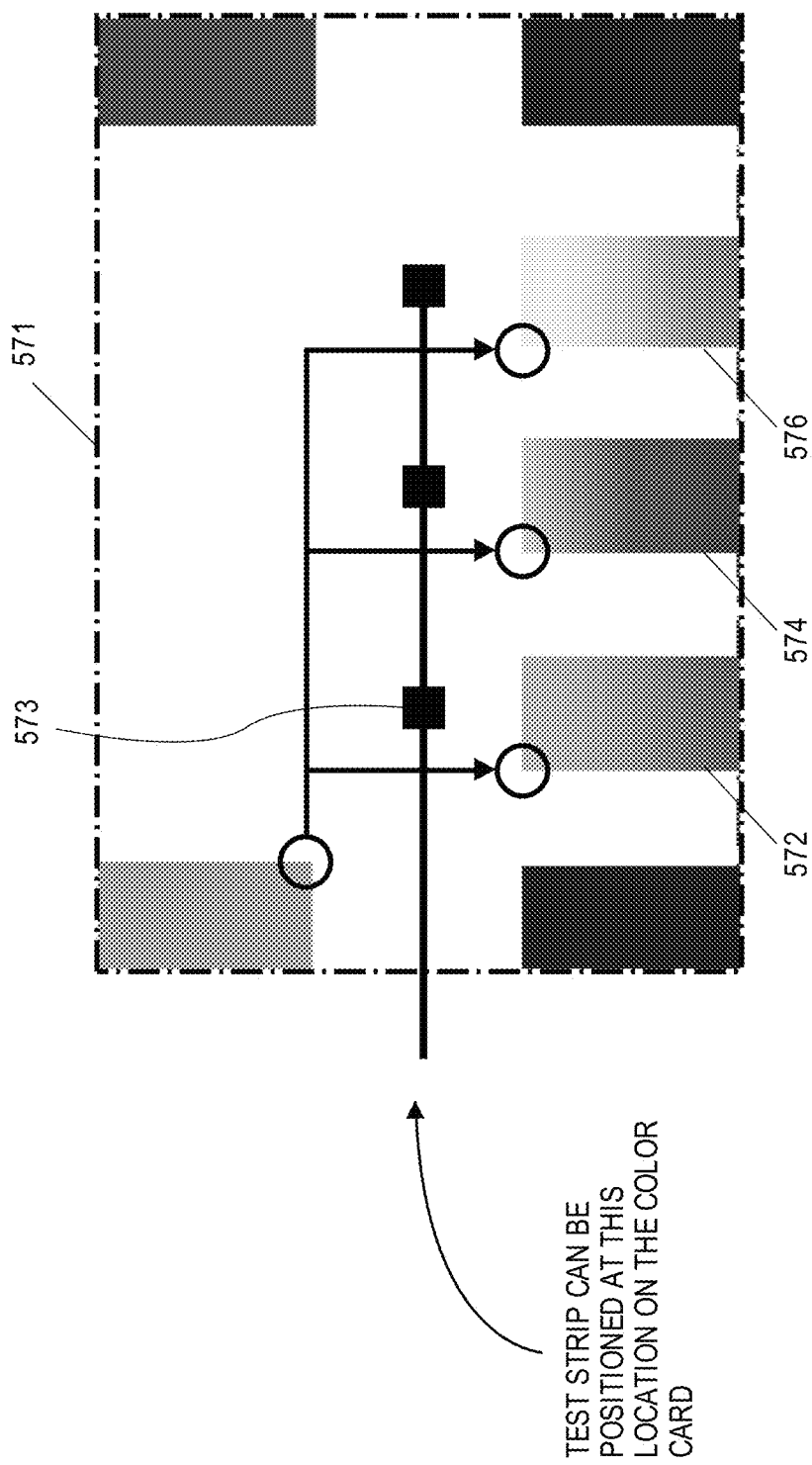
FIG. 5 illustrates finding color scale positions, according to an embodiment of the present disclosure.
Figure 6:
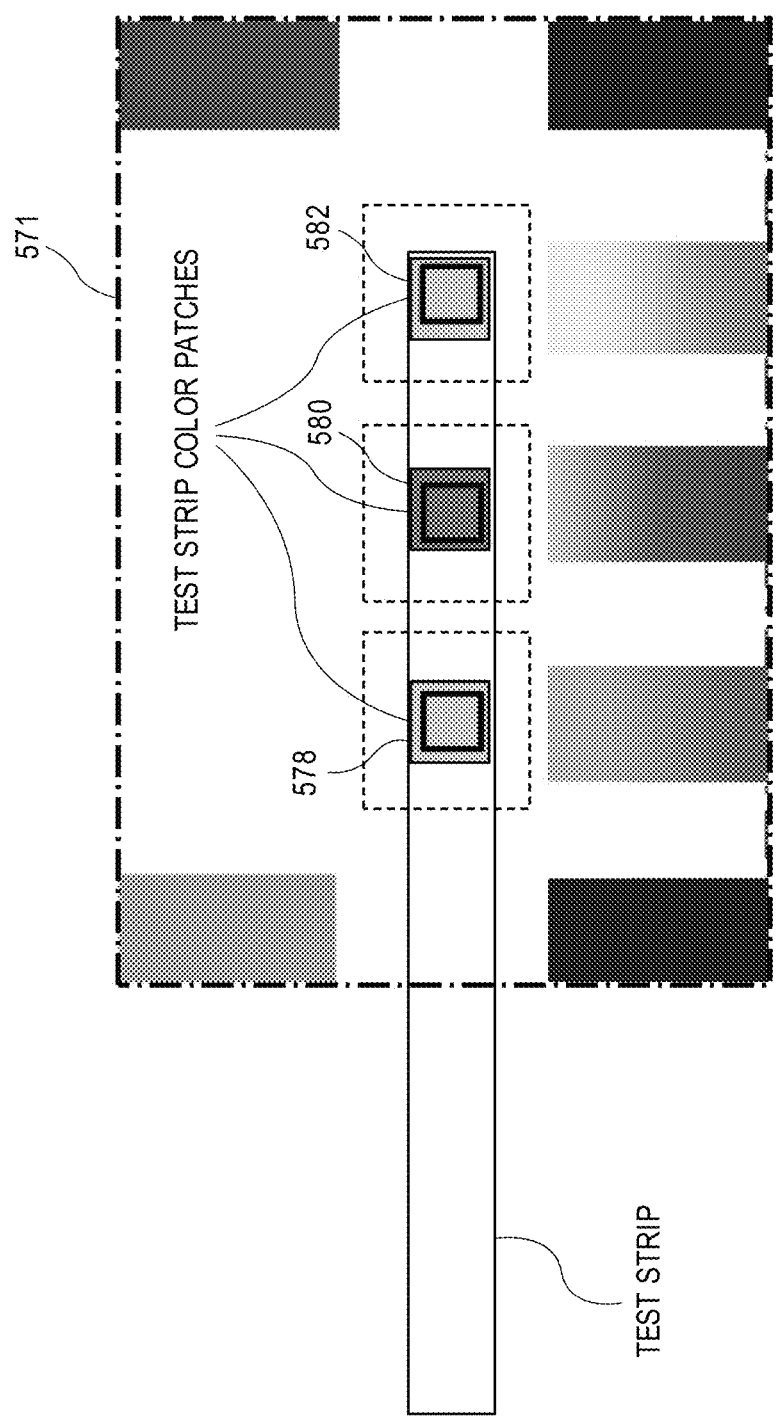
FIG. 6 illustrates determining input colors, according to an embodiment of the present disclosure.

After exposing the test strip to the sample to be tested, a user captures an image of the test strip proximate a color card after the prescribed time between dipping the test strip and image capture has passed. For example, a user can place the color test strip on a target 573 of the color card 571, as illustrated in FIGS. 5 and 6, and then take a digital picture of the color card with the test strip positioned thereon.

The purpose of the color card is to provide alignment and color references to be used for interpreting the colors of the test patches 578, 580, 582 (See FIG. 6), as well as to provide the user a target for placing the test strip in the correct location, and/or guidance on how to take the digital image they will need to capture the test. For each patch 578, 580, 582 to be measured using the system, the card contains a color scale 572, 574, 576 that comprises a color gradient that represents the range of color changes expected for that measurement, as illustrated in the embodiment of FIG. 5.

The gradient of the color scales 572, 574 and 576 can be designed to accurately represent the hue range that will be seen by the camera when it reads the input colors. This can be accomplished by any suitable technique. For example, the gradient of the color scales can be determined using an iterative process where adjustments are made to the color scales based upon taking pictures of color patches with known values, measuring the color of these color patches relative to the gradient, adjusting the gradient and taking additional pictures as necessary. In this manner the gradient of each color scale can be calibrated to allow for relatively accurate test output values, as will be discussed further below.

The image of the test strip and color card can be captured using any camera, such as a digital camera. Ideally the image captures the entire color card and has reasonably consistent light across the entire card. Note that the method adapts to a broad range of light conditions including, but not limited to, how dark or light the image is, corrections made by the camera's white balancing routine, and the source of the light (indoor florescent or incandescent, outdoor shade or direct sun). While the system may work best when the light upon the card is relatively consistent, it can also be used with inconsistent lighting conditions.

After capturing the digital image of the test strip proximate the color card, the image can be sent to the system 200 for processing, as shown at 110, 204 of FIG. 1. The system 200 processes the image to determine the results of the test and/or to prescribe action that should be taken in view of the test results. The test results and/or prescribed action are then sent to the user for viewing.

The steps of process 100 can be performed in any suitable order. For example, selecting the test configuration and/or launching the software application can be performed after capturing the image. One or more of the steps can also be omitted. For example, steps 102 and/or 104 of FIG. 1 can be omitted if the user opts to send a photo of the test strip for processing by system 200 without using the software application discussed above, such as by sending a photo of the test strip via facsimile, email, post mail, or any other suitable method to a system operator. The system operator can then manually enter the photo into system 200 for image processing.

Figure 2:
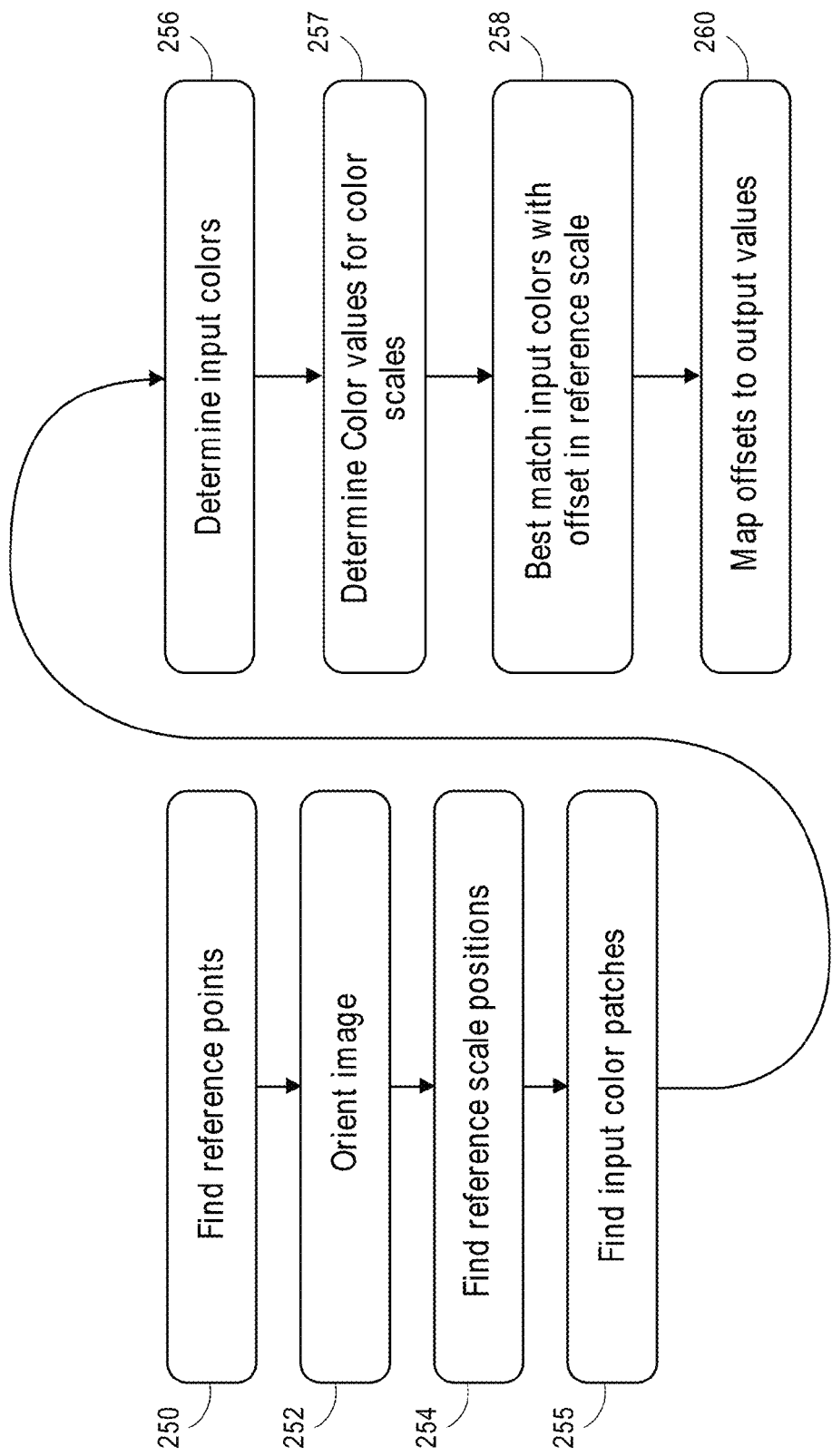
FIG. 2 illustrates a method for processing a color image, according to an embodiment of the present disclosure.
Figure 3A:
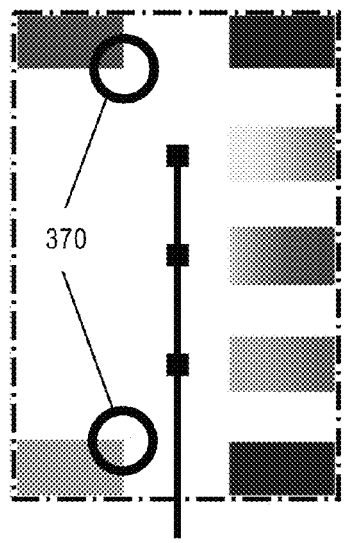
FIGS. 3A to 3D illustrate images of color scale cards in four different orientations that can potentially be provided by a user, according to an embodiment of the present disclosure.
Figure 3B:
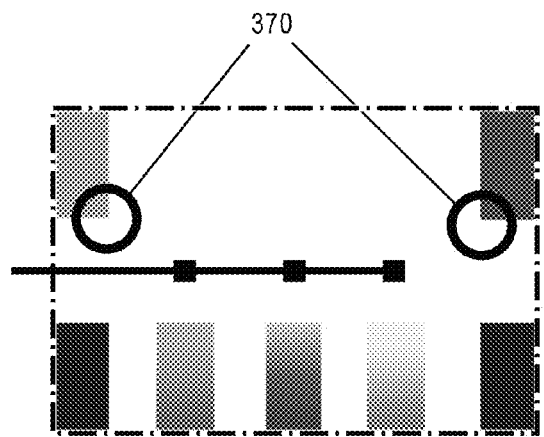
Figure 3C:
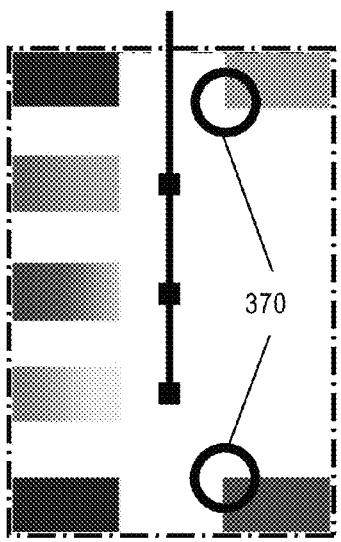
Figure 3D:
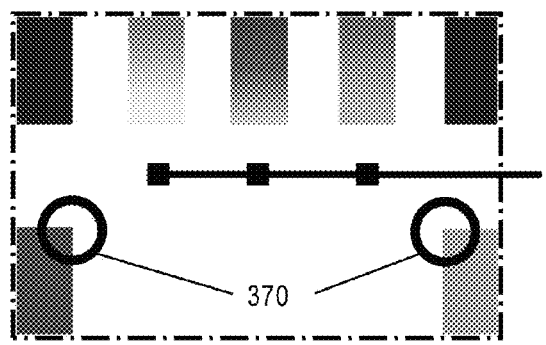
Figure 10:
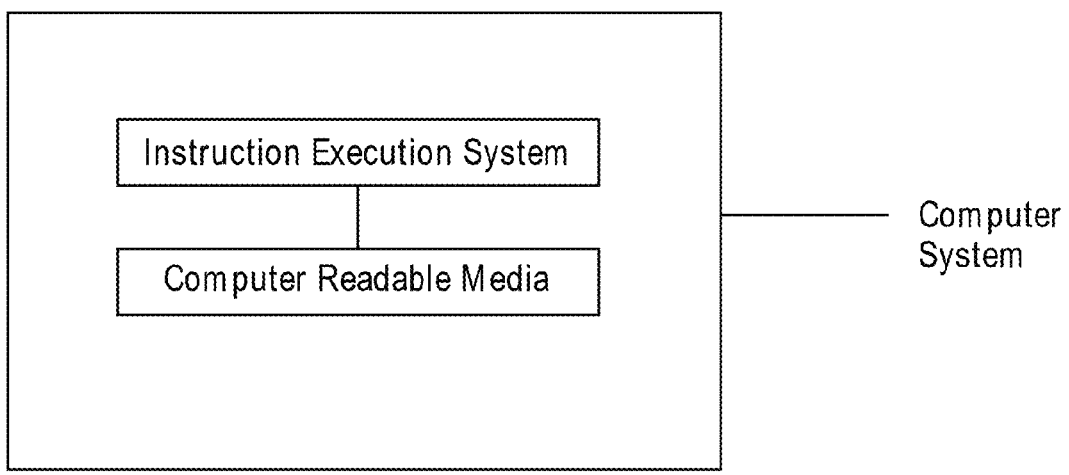
FIG. 10 illustrates an example of a computer system that could be employed for carrying out the processes of the present disclosure.

Upon receiving the digital image, system 200 follows a set of software instructions that takes it through a method for processing the image. The system 200 can be any suitable computer based system suitable for carrying out the process. An example of a computer that could be employed as part of the system 200 is shown in FIG. 10, and will be discussed in greater detail below. The system 200 can also include optionally include a scanner or other hardware (not shown). FIG. 2 illustrates an embodiment of a method for processing the image of the test strip that could be carried out by the system 200. Steps 250 to 260 of the method of FIG. 2 will now be discussed.

As shown at 250 of FIG. 2, the system 200 can be programed to find reference points on the image. In an embodiment, as illustrated in FIG. 3A-3D, reference points 370 can be positioned on the color card. The system scans the digital image of the color card to find the reference points 370 on the card image. Identifying the reference points helps to orient the image for processing and to establish the geometry of the image. Establishing the geometry helps locate the features required for completing the image processing including the test strip patches and the color scales.

Figure 4A:
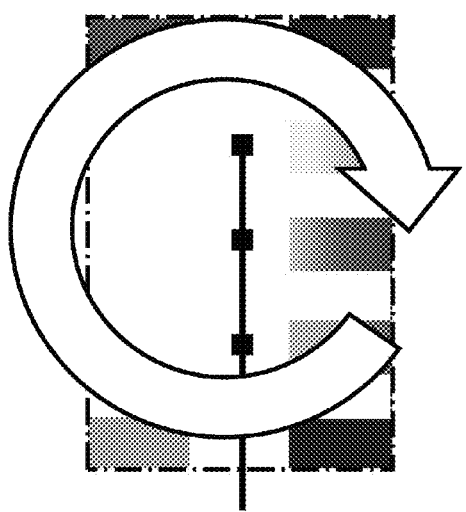
FIGS. 4A and 4B illustrate orienting the images of the color scale cards of FIGS. 3A to 3D, according to an embodiment of the present disclosure.
Figure 4B:
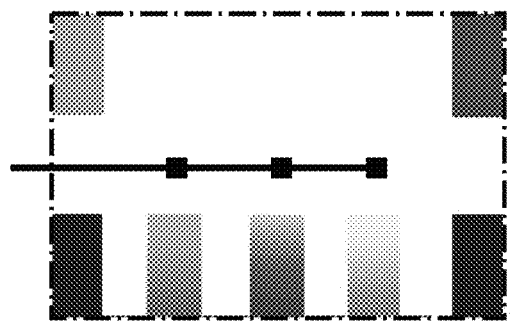

As shown at 252 of FIG. 2, the system can be programmed to orient the image in a desired manner. For example, once the reference points are identified, the image can be rotated and/or scaled to provide a consistent geometry to the image processing system. The image can be rotated or scaled to any desired position or size, and in any desired manner. An example of rotating the image is illustrated in FIGS. 4A and 4B.

As shown at 254 of FIG. 2, the system can be programed to find color scale positions. Depending upon the test configuration selected by the user, the system can use the geometric information about the color card and the test strip to identify the areas of the image to be analyzed for image processing. For example, as shown at FIG. 5, color scales 572, 574 and 576 can be identified.

As shown at 255 of FIG. 2, the system can be programed to find input color patches. In an embodiment, the system can use the geometric information to begin looking for the test strip color patches on the image, such as those shown at 578, 580 and 582 of FIG. 6. Because there is variability in where the user places the test strip on the color card, further analysis can be performed to determine the exact location of the test strip patches. This can be accomplished, for example, by looking into the area the input color patches should be, then using algorithms to identify the exact location of the color patches. Determining algorithms for identifying the location of color strips is well within the capability of one of ordinary skill in the art.

As shown at 256 of FIG. 2, color values can be determined for the test strip color patches. In an embodiment, once the color patches 578, 580 and 582 have been identified, the pixel values of the color patches can be sampled and averaged to provide one pixel value for each color patch. If desired, the system can eliminate some of the pixels in the color patches to reduce the risk of extraneous colors (such as shadows, windowing of chemicals, etc.) being included in the pixel value. Pixel values can be defined using any color representation systems. Common color representation systems include Red, Green and Blue (RGB) and Cyan, Magenta, Yellow, and Black (CMYK).

Figure 7:
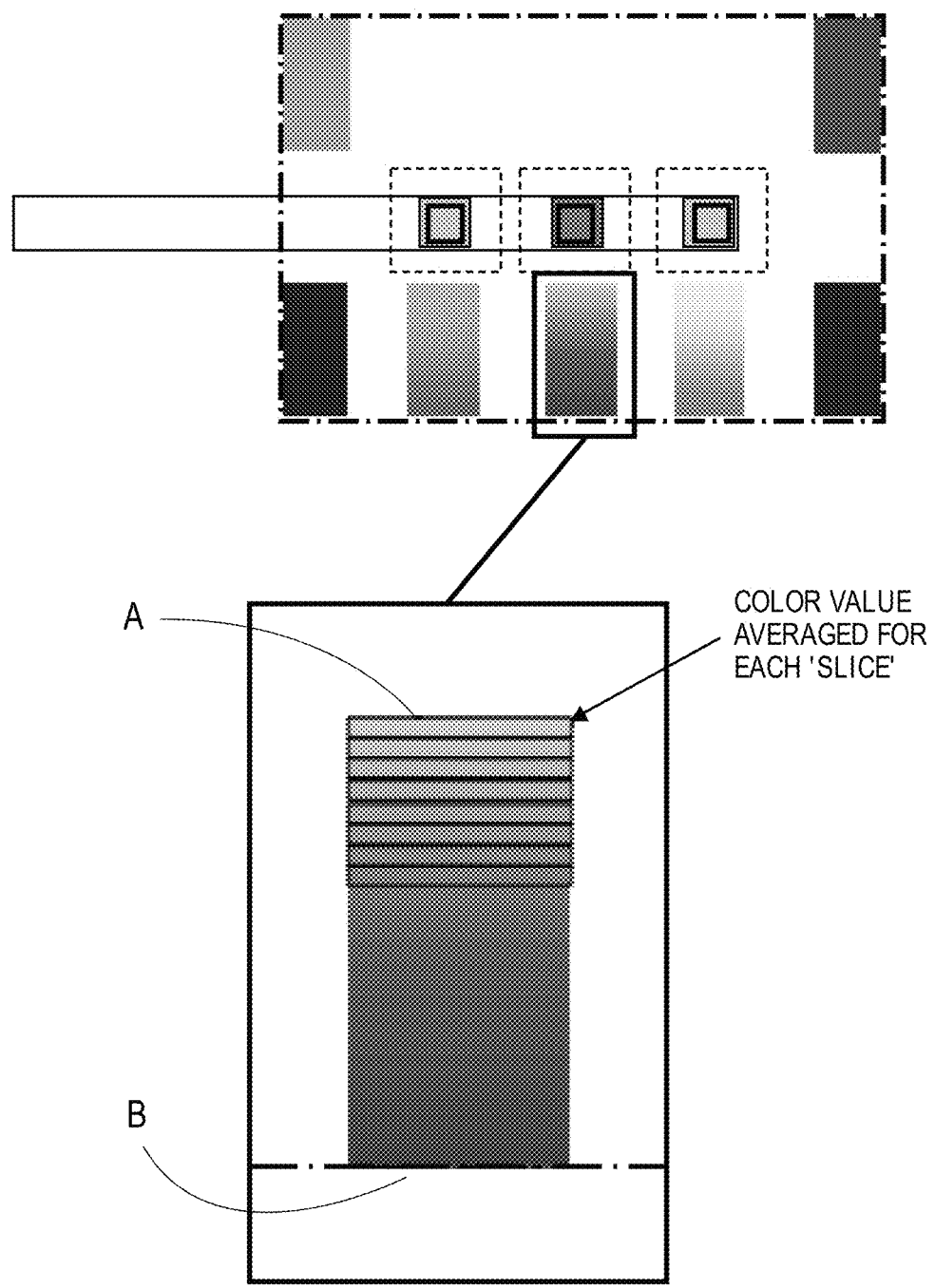
FIG. 7 illustrates determining individual color values for the color scales, according to an embodiment of the present disclosure

As shown at 257 of FIG. 2, color values can be determined for the color scales. FIG. 7 illustrates an example method for determining color scale color values. In an embodiment, for each of the color scales 572, 574 and 576 to be compared to the input colors found on the test strips, the system 'slices' the color scale and makes a series of color measurements along each slice and calculates a value for each slice. In an embodiment, the value is an average color value for each slice, such as the average color value of all sampled pixels in the slice. Any desired portion of pixels in each slice could be sampled, such as all the pixels or a portion of the geometry of the pad. For example, in the case of color test strips, sometimes a color pad will "window shade" where more of the color goes to the edges of the pad, resulting in more color showing on the edges and more white in the middle. If desired, the sampling can account for this by sampling pixels around the edges of the color pad while excluding or reducing sampling in the center region (e.g., sampling in a shape like a donut around the center of the pad while excluding the center portion of some or all slices of the pad). Alternatively, the color value can be determined in any other suitable manner, such as a weighted average, top/bottom X %, median, or any other sampling technique whose measurements have empirically been shown to provide desired color matching results. Each of these horizontal 'slices' can be as small as one pixel tall by the width of the color scale. Fewer slices may be created to reduce processing time, but will result in lower resolution of the measurement.

Figure 8:
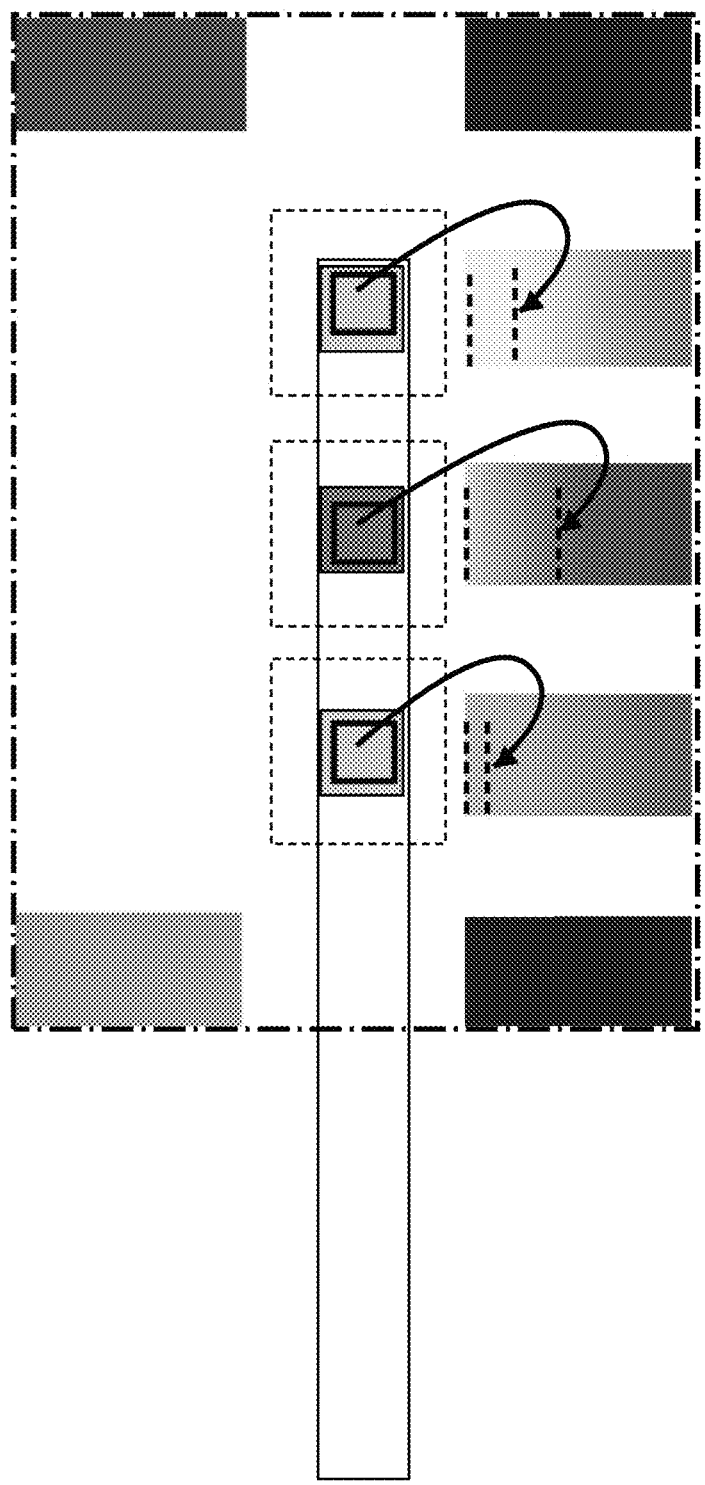
FIG. 8 illustrates matching input colors with corresponding color in the color scale, according to an embodiment of the present disclosure.

As shown at 258 of FIG. 2, input colors can be matched with offset in color scale. An example of the matching process is illustrated by FIG. 8. In an embodiment, for each test strip patch being tested, a 'best match' fit can be calculated that compares the average color value of the test strip color patch to the average color values calculated for the color scale slices. The slice with the nearest color value is selected and used to determine where along the color scale the test strip reading fits. This process can be carried out for each test strip patch being analyzed to determine a location, or offset, on each of the color scales that best matches the associated test strip patch. The offset can be determined in any suitable manner, such as by determining a distance along the gradient, or a percent of distance from one end of the gradient, to the selected slice in the gradient. In an embodiment, the distance can be measured in pixels (e.g., number of pixels from an end of a gradient), but can be translated into a physical distance with knowledge of the card geometry, as would be readily understood by one of ordinary skill in the art.

Figure 9:
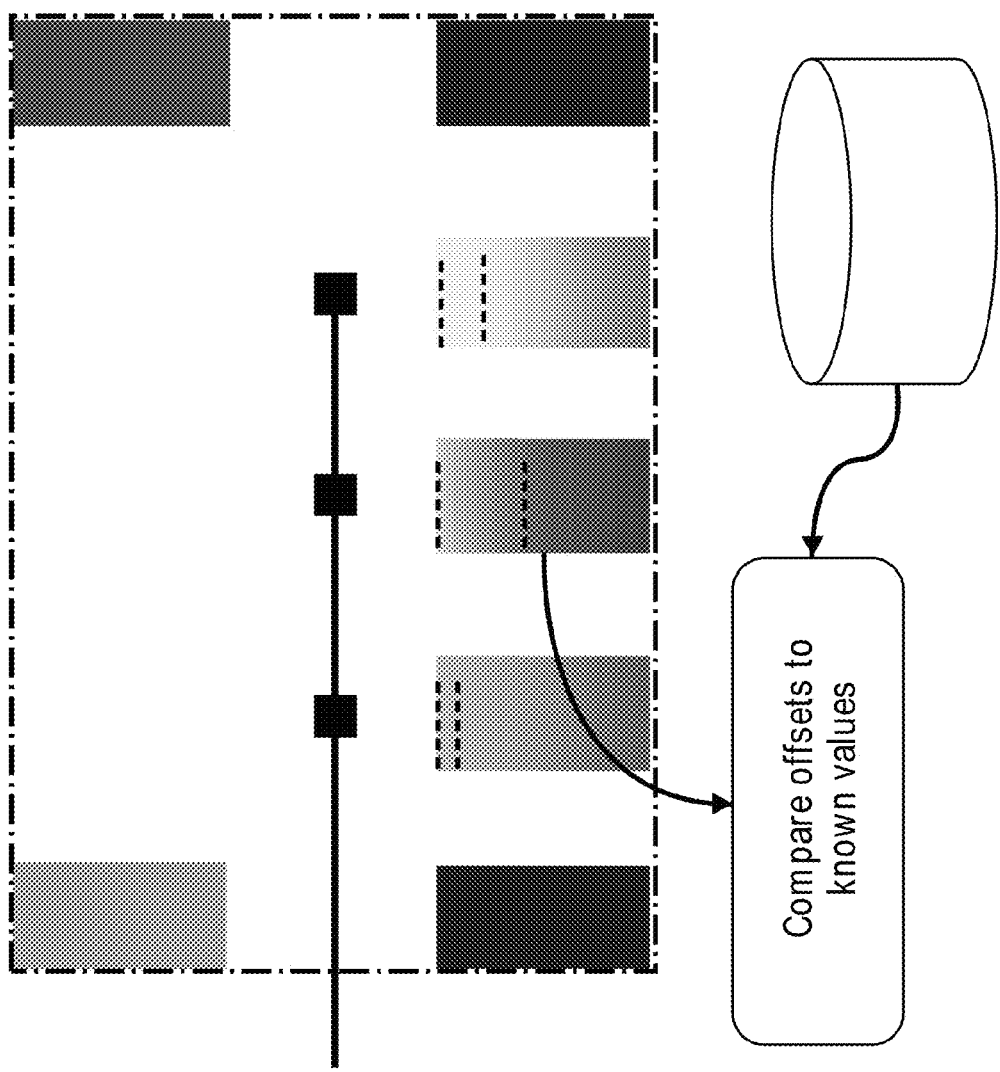
FIG. 9 illustrates matching offset to output value, according to an embodiment of the present disclosure.

Offset in color scale can then be mapped to output values, as shown at 260 of FIG. 2. An example of this mapping process is illustrated by FIG. 9. The color scale can be calibrated beforehand to determine appropriate test output values for each position along the color gradient. This allows the location, or offset, on the color scale that best matches the test strip to be mapped to a known output value that is determined for that particular location during the calibration process. For example, the closest match might occur 70% of the way down the length of the color scale. The system then uses this as an index into a list of known values. Thus, for example, the position 70% along the color scale might reflect a pH of 8.0 if the list of values for pH were; 6.2, 6.6, 6.8, 7.2, 7.4, 7.6, 7.8, 8.0, 8.2, 8.4, 8.6, where end position "A" on the color scale 574 has been calibrated to correspond to a value of 6.2 and end position "B" has been calibrated to correspond to a value of 8.6. This mapping process can be carried out for each color scale offset calculated in step 258, thereby determining output values for each color patch on a test strip.

The instructions for carrying out the processes of the present application, including the process of FIG. 2 for processing a photographic digital image, as described above, can be embodied in any non-transient computer readable media. The computer readable media can be for use by or in connection with any instruction execution system, such as a computer processor, an ASIC (Application Specific Integrated Circuit) or other system that can fetch or obtain the logic from the computer-readable media and execute the instructions contained therein. The computer readable media can be any non-transient media that can contain, store, or maintain programs and data for use by or in connection with the instruction execution system. Examples of suitable computer readable media include electronic, magnetic, optical, electromagnetic and semiconductor media. More specific examples include a portable magnetic computer diskette such as a floppy diskette or hard drive, a random access memory (RAM), a read-only memory (ROM), an erasable programmable read-only memory, or a portable compact disc. FIG. 10 shows an example system comprising both an instruction execution system and computer readable media for carrying out the methods of the present disclosure.

The methods and systems of the present disclosure can be used in any application in which it would be desirable or useful to compare colors or determine the color of an object using a film or digital photograph of the object. Examples of such applications can include diagnostic color testing and color adjusting of printers used to print photos taken with digital cameras. The example of adjusting printers could include photographing a sample color page printed from the printer being tested together with a color scale card. The photograph could then be processed using the techniques of the present disclosure to determine a color on the sample color page. Based on the results, adjustments could be made to the printer such that the printer output matched the results found by the computer measurement. One of ordinary skill in the art would readily be able to employ the systems and processes of the present disclosure in a variety of such applications.

Although the flow diagram of FIGS. 1 and 2 show specific order of execution, the order is illustrative only and the order of execution of steps may differ from that which is depicted. For example, the order of execution of two or more blocks may be reversed relative to the order shown. Also, two or more blocks shown in succession may be executed concurrently or with partial concurrence.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for interpreting a color in a photographic digital image, the method comprising:
   receiving a photographic digital image comprising a color portion proximate to a color scale, wherein different spatial positions on the color scale correspond to different known outcome values; and
   carrying out with a computer a set of software instructions for processing the photographic digital image, the processing comprising:
      locating the position of the color portion in the digital image;
      determining a digital color value for the color portion;
      determining digital scale color values at different positions on the color scale;
      comparing the digital color value to one or more digital scale color values to determine a digital reference color value that approximates the digital color value of the color portion;
      determining a position of the digital reference color value on the color scale; and
      determining an outcome value based on the position of the digital reference color value.

2. The method of claim 1, wherein the color portion comprises a color patch showing the results of a color test.

3. The method of claim 1, wherein the photo is a digital photo.

4. The method of claim 1, wherein the color scale in the photo is an image of a color strip printed on a media comprising a plurality of color patches.

5. The method of claim 4, wherein the media is a color card.

6. The method of claim 5, further comprising finding reference points on the color card and either rotating the image of the color card to a desired orientation or scaling the image of the color card to a desire size.

7. The method of claim 5, further comprising receiving geometric information from a user regarding the color card and the test strip and using the geometric information to identify areas of the image to analyze for image processing.

8. The method of claim 5, wherein pixel values of the color patches are sampled and averaged to provide one value for each color patch.

9. The method of claim 1, wherein determining digital scale color values comprises slicing the color scale and making a series of color measurements along each slice and calculating an average color value for each slice.

10. The method of claim 1, further comprising prescribing a recommended action based on the outcome value and communicating the recommended action to a user.

11. The method of claim 1, wherein the digital image is a digital photo.

12. The method of claim 1, wherein the digital image is a digital copy of a photograph produced using film photography.

13. A non-transient computer readable media embedded with a set of instructions for carrying out a method comprising:
   locating the position of a color portion in a photographic digital image, the photographic digital image comprising the color portion proximate to a color scale, wherein different spatial positions on the color scale correspond to different known outcome values;
   determining a digital color value for the color portion;
   determining digital scale color values at different positions on the color scale;
   comparing the digital color value to one or more digital scale color values to determine a digital reference color value that approximates the digital color value of the color portion;
   determining a position of the digital reference color value on the color scale; and
   determining an outcome value based on the position of the digital reference color value.

14. A system for interpreting a color of a digital image, the system comprising a non-transient computer readable media embedded with a set of instructions and an instruction execution system configured to communicate with the computer readable media to carry out the instructions, wherein the set of instructions are for carrying out a method comprising:
   locating the position of a color portion in a photographic digital image, the photographic digital image comprising the color portion proximate to a color scale, wherein different spatial positions on the color scale correspond to different known outcome values;
   determining a digital color value for the color portion;
   determining digital scale color values at different positions on the color scale;
   comparing the digital color value to one or more digital scale color values to determine a digital reference color value that approximates the digital color value of the color portion;
   determining a position of the digital reference color value on the color scale; and
   determining an outcome value based on the position of the digital reference color value.

15. A color test system comprising:
   a color test strip comprising a color patch for testing a sample, the color patch configured to turn different colors depending on sample chemistry; and
   a color reference comprising,
      a color scale positioned on a media;
      a target area printed on the media for positioning a test strip proximate the color scale; and
      reference points printed on the media, the reference points being different form the color scale and configured to allow identification and orientation of a digital image of the color test system by a computer system.

16. The color test system of claim 15, wherein the color test strip comprises a plurality of color patches, each color patch designed to test a different chemical property of the sample.

17. The color test system of claim 16, wherein the color reference comprises a plurality of color scales, each color scale associated with a color patch on the color test strip.

18. The color test system of claim 15, wherein the media is a card.

* * * * *